United States Patent
Breuer

(10) Patent No.: US 11,027,710 B2
(45) Date of Patent: Jun. 8, 2021

(54) EMERGENCY BRAKING SYSTEM FOR A VEHICLE AND METHOD FOR CONTROLLING THE EMERGENCY BRAKING SYSTEM

(71) Applicant: WABCO Europe BVBA, Brussels (DE)

(72) Inventor: Karsten Breuer, Oberreute (DE)

(73) Assignee: WABCO EUROPE BVBA, Brussels (BE)

( * ) Notice: Subject to any disclaimer, the term of this patent is extended or adjusted under 35 U.S.C. 154(b) by 219 days.

(21) Appl. No.: 16/092,765

(22) PCT Filed: Apr. 3, 2017

(86) PCT No.: PCT/EP2017/000410
§ 371 (c)(1),
(2) Date: Oct. 11, 2018

(87) PCT Pub. No.: WO2017/220177
PCT Pub. Date: Dec. 28, 2017

(65) Prior Publication Data
US 2019/0168721 A1 Jun. 6, 2019

(30) Foreign Application Priority Data
Jun. 23, 2016 (DE) .................. 10 2016 007 676.3

(51) Int. Cl.
*B60T 8/00* (2006.01)
*B60T 8/171* (2006.01)
(Continued)

(52) U.S. Cl.
CPC .............. *B60T 7/22* (2013.01); *B60T 17/22* (2013.01); *B60T 2201/022* (2013.01); *B60T 2270/406* (2013.01)

(58) Field of Classification Search
None
See application file for complete search history.

(56) References Cited

U.S. PATENT DOCUMENTS

| 5,436,835 A | 7/1995 | Emry |
| 6,672,683 B1 * | 1/2004 | Stumpe .................. B60T 7/042 303/186 |

(Continued)

FOREIGN PATENT DOCUMENTS

| CN | 101443830 A | 5/2009 |
| CN | 102371980 A | 3/2012 |

(Continued)

*Primary Examiner* — Adam D Tissot
*Assistant Examiner* — Laura E Linhardt
(74) *Attorney, Agent, or Firm* — Leydig, Voit & Mayer, Ltd.

(57) ABSTRACT

An emergency braking system for a vehicle includes an emergency braking control unit configured to control the emergency braking system according to a first parameter set. The first parameter set is selected by the emergency braking control unit from a plurality of parameter sets. Each respective parameter set of the plurality of parameter sets is associated with a respective vehicle variant and adapts the emergency braking system to the respective vehicle variant. Each respective vehicle variant is characterized by a design of a braking system of the respective vehicle variant for adapting the emergency braking system of the respective vehicle variant to the design of the braking system of the vehicle variant. The first parameter set is associated with a first vehicle variant that characterizes the vehicle.

20 Claims, 2 Drawing Sheets

(51) Int. Cl.
  *B60T 7/12* (2006.01)
  *B60T 13/00* (2006.01)
  *B60T 7/22* (2006.01)
  *B60T 17/22* (2006.01)

(56) References Cited

U.S. PATENT DOCUMENTS

| | | | |
|---|---|---|---|
| 2004/0193351 A1* | 9/2004 | Takahashi | B60T 7/22 |
| | | | 701/70 |
| 2009/0237226 A1 | 9/2009 | Okita | |
| 2012/0074770 A1* | 3/2012 | Lee | B60T 8/172 |
| | | | 303/20 |
| 2012/0239266 A1* | 9/2012 | Kato | B60W 10/188 |
| | | | 701/70 |
| 2013/0144498 A1* | 6/2013 | Kim | B60T 7/22 |
| | | | 701/70 |
| 2016/0167519 A1* | 6/2016 | Luke | B60L 7/18 |
| | | | 701/22 |
| 2017/0166172 A1* | 6/2017 | Kwon | B60T 7/22 |

FOREIGN PATENT DOCUMENTS

| | | |
|---|---|---|
| CN | 103144619 A | 6/2013 |
| DE | 19729952 A1 | 1/1999 |
| DE | 102006053559 A1 | 5/2008 |
| DE | 102006053561 B4 | 5/2008 |
| DE | 102008040366 A1 | 1/2010 |
| DE | 102012002823 A1 | 9/2012 |

\* cited by examiner

EMERGENCY BRAKING SYSTEM FOR A VEHICLE AND METHOD FOR CONTROLLING THE EMERGENCY BRAKING SYSTEM

CROSS REFERENCE TO RELATED APPLICATIONS

This application is a U.S. National Stage Application under 35 U.S.C. § 371 of International Application No. PCT/EP2017/000410 filed on Apr. 3, 2017, and claims benefit to German Patent Application No. DE 10 2016 007 676.3 filed on Jun. 23, 2016. The International Application was published in German on Dec. 28, 2017, as WO 2017/220177 A1 under PCT Article 21(2).

FIELD

The invention concerns an emergency braking system for a vehicle, in particular a utility vehicle, and a method for controlling the emergency braking system.

BACKGROUND

Braking systems in a vehicle comprise a control unit, in which a parameter set of control parameters is placed, with which the braking system is parameterized, i.e. the braking system is suitably adapted by means of the control parameter. The parameterization is carried out in particular depending on statutory requirements, for example a type test according to the technical regulation ECE-R13, which sets defined requirements for braking that is carried out with the vehicle.

If the braking system is additionally fitted with an emergency braking system (AEBS), according to the ECE-R13, in particular according to 347/2012/EC it is specified when the driver is to be forewarned about autonomously initiated emergency braking by means of a warning device, in order to possibly be able to still intervene in the braking process himself. The forewarning is carried out visually in this case and additionally for example also audibly and haptically at different points in time before the emergency braking is initiated, wherein the points in time for the forewarnings are specified exactly according to ECE-R13. Furthermore, it is also specified from which emergency braking point in time the vehicle may be autonomously decelerated before an impending collision, in particular in order not to irritate the following traffic and to avoid rear-end collision accidents.

To determine the respective points in time at which a collision is to be expected is therefore initially to be predictively determined by an emergency braking control unit. Said predictive determination is carried out in this case using the parameterization, i.e. depending on the control parameter stored in the emergency braking control unit. Depending on detected objects in a vehicle surroundings, first a probability of collision with the detected objects is determined for this purpose from the point in time for an impending collision using the control parameter and the own vehicle dynamics.

According to DE 10 2012 002 823 A1, for example it is provided to actuate a braking system with a control unit in such a way that it is autonomously controlled depending on an operating state of the vehicle, wherein in particular steering interventions are also carried out as braking interventions, in particular depending on detection of the surroundings. In this case, the control unit comprises a data memory, in which in particular control parameters can be stored, which for example include control and regulation algorithms. Depending on the set operating state, the control parameters can be varied by an operator by means of an external input system.

DE 10 2006 053 561 B4 describes a test of an emergency braking system, wherein a conventional emergency braking system is used, which continuously assesses a traffic situation using a distance from an object ahead and initiates emergency braking on detecting a possible collision with the object ahead. In this case, in the presence of potential emergency braking first a visible or audible warning is output to the driver before the emergency braking is initiated. Following a period of time, a haptic warning is output that is preferably carried out by a first slight braking intervention that can be detected in the vehicle as a braking pressure. If no driver intervention is carried out following a further period of time, the automatic emergency braking is fully initiated so that a collision can just still be avoided.

It is a disadvantage of this that the forewarnings and the emergency braking are carried out using previously determined control parameters that are matched to a vehicle variant with the poorest braking within a model series in order to ensure that legal requirements can be met for said model series in all cases. I.e., the control parameters are specified according to poor braking performance or poor efficiency of the braking system. Thus, in the case of a vehicle with good braking of said model series, in the case of emergency braking it reacts to a collision point in time that has been calculated using control parameters for a vehicle with poor braking of said model series, so that on the one hand the forewarning is output very early for a vehicle with good braking and in addition autonomous emergency braking may also be initiated too early. In particular, the forewarning can be interpreted by the driver as a defect warning if he notices that the forewarning is frequently carried out too early. As a result, the acceptance for an autonomously controlled braking system of this type reduces and the driver also assumes a defect warning in the event of correctly output forewarnings; safety in the event of emergency braking is reduced.

According to DE 10 2008 040 366 A1, it is provided for this to store control parameters in an EEPROM memory in an ESP system or an ABS system in such a way that the braking system can be parameterized depending on the current vehicle variant. Therefore, a plurality of parameter sets of control parameters are stored in the EEPROM memory and the control parameters corresponding to the current vehicle variant are loaded from the EEPROM memory into a RAM memory of a computing unit of the braking system, so that the functional components of the vehicle, i.e. in particular the brakes of the braking system, can be actuated with the loaded control parameters in an ABS or ESP situation. Thus, control parameters for all conceivable vehicle variants can first be pre-stored in a memory unit and the vehicle can be controlled during operation with the control parameters that have been read in for the current vehicle variant.

SUMMARY

In an embodiment, the present invention provides an emergency braking system for a vehicle. The emergency braking system includes an emergency braking control unit configured to control the emergency braking system according to a first parameter set. The first parameter set is selected by the emergency braking control unit from a plurality of parameter sets. Each respective parameter set of the plurality of parameter sets is associated with a respective vehicle variant and adapts the emergency braking system to the respective vehicle variant. Each respective vehicle variant is characterized by a design of a braking system of the respective vehicle variant for adapting the emergency braking system of the respective vehicle variant to the design of the braking system of the vehicle variant. The first parameter set is associated with a first vehicle variant that characterizes the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
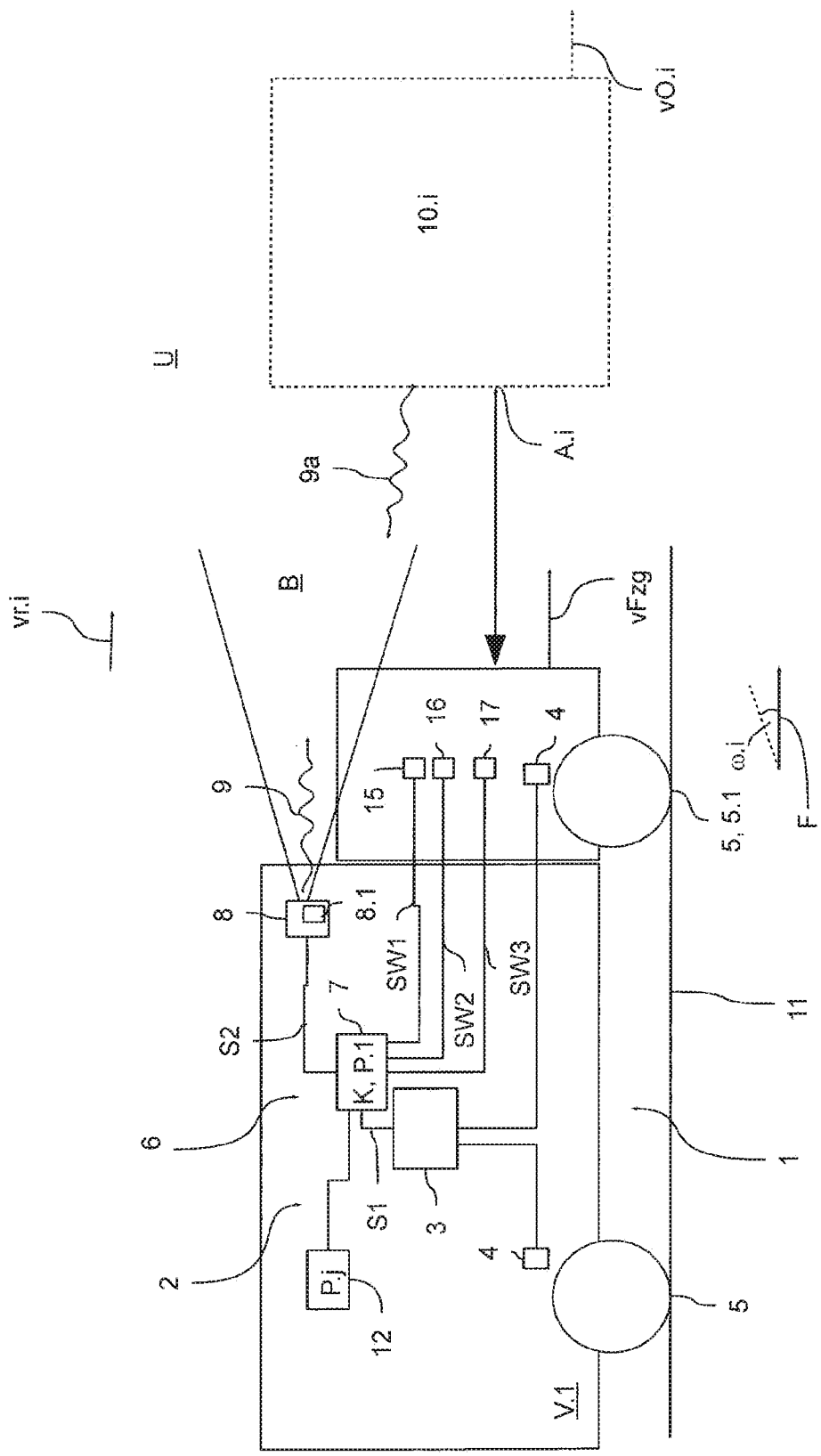
FIG. 1 shows a utility vehicle with an emergency braking system.
Figure 2:
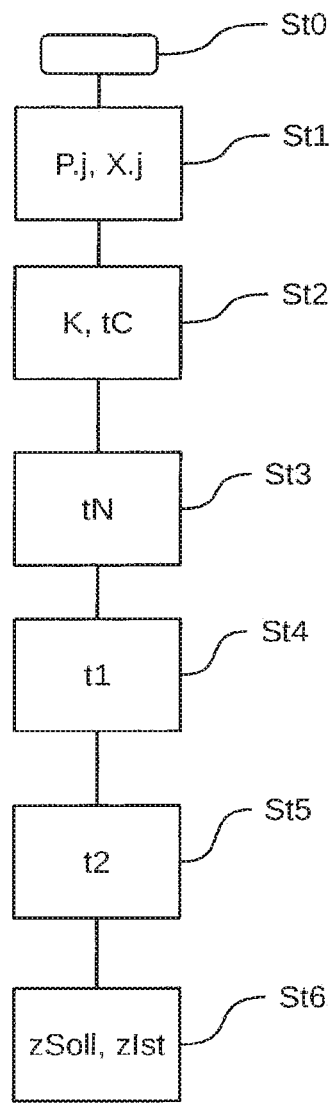
FIG. 2 shows a flow chart for carrying out a method.

Embodiments of the invention provide emergency braking systems with which emergency braking can be carried out safely and reliably. Furthermore, embodiments of the invention provide methods for controlling the emergency braking system.

According to embodiments of the invention, an emergency braking system selects a parameter set from a plurality of parameter sets of control parameters that matches the emergency braking system to a currently present vehicle variant with a suitably configured braking system in which the emergency braking system is provided. For this purpose, a parameter set associated with the currently present vehicle variant can be called up by an emergency braking control unit of the emergency braking system from a plurality of provided parameter sets, depending on which the emergency braking control unit controls the emergency braking system, wherein this is understood to mean that the emergency braking control unit carries out the calculations thereof in particular in relation to a collision probability and the resulting output of warning signals and the demand for autonomous braking according to said selected parameter set.

As a result, it can advantageously already be achieved that the emergency braking system is adapted to the actually present current vehicle variant, wherein the selection of the parameter set can only be carried out with knowledge of the vehicle variant, advantageously by the manufacturer of the vehicle itself. Thus, the manufacturer provides the emergency braking system with a plurality of parameter sets, from which the parameter set matching the actual vehicle can be selected by the manufacturer of the vehicle. As a result, the calculations, in particular of the collision probability and resulting points in time for a forewarning and an emergency braking point in time for a demand for autonomous braking, can be carried out accurately using actually present values for the corresponding braking system used. Safety in the vehicle increases because of reliable control of the emergency braking system.

The plurality of parameter sets are each assigned to a defined vehicle variant, preferably a vehicle variant within a defined model series, so that only a limited number of parameter sets are provided for the possible vehicle variants of a model series by the manufacturer of the emergency braking system, whereby the amount of data can be optimized. The manufacturer of the vehicle itself can then offer different vehicle variants within the model series by differently configuring the braking system, for example the efficiency of the braking system or a type of vehicle construction, and can adapt the emergency braking system to said configuration of the braking system in a simple manner by selecting the corresponding parameter set.

The efficiency of the braking system can be classified advantageously here as minimal, normal and very good, so that a simple division is enabled within specified limits, for example for the braking force. Furthermore, the braking system can for example be characterized using the design of the utility vehicle, i.e. for example depending on an axle configuration, i.e. the number of wheels and the driven wheels of the vehicle, wherein for example there can be a 4×2 axle configuration, i.e. two driven wheels in the case of a total of four wheels, or a 6×2 axle configuration, i.e. two driven wheels in the case of a total of six wheels. In addition, the possibility of a lift axle can also be taken into account in the axle design, i.e. a vehicle axle with wheels that are raised off the road in the case of a certain load and thus no longer contribute to braking. The design can for example also be divided into a type of vehicle, for example a truck with or without a trailer or a towing vehicle for a semi-trailer with a trailer or a tractor or a bus.

Thus, the design of the braking system can be influenced by a number of properties of the vehicle, wherein said properties are to be taken into account in the selection of the parameter set. This is because in particular the calculation of the time until a collision (time to collision, TTC) and thus also the probability of a collision, depends on this, i.e. whether the vehicle with a braking system that is designed in such a way can still be decelerated in time before an object.

Also, the statutorily required points in time for warning signals to be output by different warning devices before initiating emergency braking, which for example are specified according to ECE-R13, in particular the type test according to 347/2012/EC, depend on said properties of the vehicle or the braking system. Therefore, at a first point in time before initiating autonomous emergency braking a warning signal that is not only visible, for example a visible and audible warning signal, is to be output and at a second point in time before initiating autonomous emergency braking a signal that is not only visible, for example a visible and haptic signal, is to be output. Because the points in time are coupled to the emergency braking point in time for triggering an autonomous braking demand, said points in time are also dependent on the selected parameter set.

Thus, the emergency braking can advantageously be carried out safely and reliably, because statutorily prescribed points in time are met and said points in time are adapted to the actually present braking system, so that as a result no premature forewarnings are output that can be perceived by the driver as false messages; the acceptance of the emergency braking system is increased.

The plurality of parameter sets can for example be placed in a memory unit to which the emergency braking control unit of the emergency braking system has access. The parameter sets can already be stored in the memory unit by the manufacturer of the emergency braking system, wherein the memory unit can already be part of the emergency braking system. Alternatively, the parameter sets can also be subsequently transferred to any memory unit in the vehicle, for example if the emergency braking system is fitted retrospectively.

Advantageously, a unique identifier is associated with each parameter set, wherein the identifier characterizes a design of the braking system in a clear way, i.e. the efficiency of the braking system or the design of the vehicle variant of a model series. As a result, a parameter set tailored for the corresponding vehicle variant can be selected by means of the identifier in a simple way, for example by the manufacturer of the vehicle specifying the design of the braking system and the emergency braking control unit automatically selecting a parameter set with said identifier, so that the emergency braking control unit can control the emergency braking system according to said parameter set.

Furthermore, statutory requirements relating to a vehicle actual deceleration and a speed reduction that is to be fulfilled can be taken into account before and during the emergency braking, wherein this is also carried out according to the selected parameter set.

According to FIG. 1, a vehicle 1, in particular a utility vehicle, is represented, which comprises a braking system 2, in particular an electrically controlled pneumatic, electrical or hydraulic braking system. In the braking system 2, service brakes 4 are provided which, controlled by a braking control unit 3, can decelerate the wheels 5 of the vehicle 1 in order to decelerate the vehicle 1. Furthermore, an emergency braking system 6 with an emergency braking control unit 7 is provided as part of the braking system 2, wherein the emergency braking control unit 7 according to said exemplary embodiment is connected to the braking control unit 3 as an external emergency braking control unit 7 and can exchange emergency braking signals S1. The braking system 2 of the vehicle 1 is designed in such a way that a first vehicle variant V.1 is embodied within a certain model series, wherein a first identifier X.1 is associated with the first vehicle variant V.1.

The emergency braking control unit 7 is embodied, depending on a collision probability K, which in particular results from a time tC until a collision (time to collision, TTC) and the design of the braking system 2, to cause emergency braking by outputting a suitable emergency braking signal S1 to the braking control unit 3 at an emergency braking point in time tN on detecting an impending emergency braking situation, which thereupon causes braking so that the vehicle 1 is decelerated. In this case, the emergency braking is brought about autonomously, i.e. without the driver having to intervene. In addition, depending on the probability of an accident K a first warning signal SW1 is output to a first warning device 15, a second warning signal SW2 is output to a second warning device 16 and a third warning signal SW3 is output to a third warning device 17 in order to be able to warn the driver of the vehicle 1 in advance before an impending emergency braking situation. In this case, for example, the first warning device 15 is an optical warning device, the second warning device 16 is an acoustic warning device and the third warning device 17 is a haptic warning device. The output of the warning signals SW1, SW2, SW3 is carried out according to statutory requirements in combination, i.e. for example a visible signal and an audible signal or a visible signal and a haptic signal are output at the same time. The driver himself may then still cause braking of the vehicle 1 and/or may initiate steering.

For detecting the emergency braking situation depending on the collision probability K, the emergency braking control unit 7 receives sensor signals S2 of an environment detection system 8 and processes said signals. According to said embodiment, the environment detection system 8 comprises a sensor 8.1, for example a radar sensor or a LIDAR sensor, and radiates electromagnetic radiation 9 into surroundings U in front of the vehicle 1 or lying in a direction of travel F, wherein the electromagnetic radiation 9 is radiated in an angular range B, so that the surroundings U in an angular range B can be monitored.

The electromagnetic radiation 9 is reflected at an object 10.$i$ in front of the vehicle 1 in such a way that a part of the electromagnetic radiation 9$a$ reflected from the object 10.$i$ is returned back to the environment detection system 8. The environment detection system 8 detects said part of the reflected electromagnetic radiation 9$a$ and analyzes said part, for example by a comparison of the radiated electromagnetic radiation 9 in the angular range B with the reflected electromagnetic radiation 9$a$. In particular, a distance A.i from the object 10.$i$ and an angle $\square$.i to the object 10.$i$ relative to the direction of travel F of the vehicle 1 can be concluded from the analysis and a relative speed vr.i of the object 10.$i$ relative to the actual vehicle 1 can be concluded from a Doppler effect measurement. A corresponding object speed vO.i of the object 10 can be derived from the speed vr.i relative to the object 10.$i$ by using a vehicle speed vFzg of the own vehicle 1.

Thus, the surroundings U in the angular range B in front of the vehicle 1 can be scanned by the environment detection system 8 by means of the electromagnetic radiation 9 and the distance A.i, the angle $\square$.i and the relative speed vr.i can be determined for each detected object 10.$i$ and stored in the emergency braking control unit 7 in association with the respective object 10.$i$. Said information can be stored for the object 10.$i$ so that the movement of the object 10.$i$ against time and thereby the change of the data with time, such as for example the distance A.i, the angle $\square$.i and the relative speed vr.i, can be observed in a simple way.

With said information about the detected object 10.$i$, the emergency braking control unit 7 can then calculate a probability of collision K with the detected object 10.$i$ for the own vehicle 1 and can decide whether an emergency braking situation exists. For the calculation of the probability of collision K, for example it is taken in to account whether the own vehicle 1 can still brake in time with the current relative speed vr.i and the current distance A.i without a collision with the object 10.$i$ with damage to persons occurring, i.e. the time tC to a possible collision is determined and it is estimated using the design of the braking system 2 whether the vehicle 1 can still be decelerated.

For the calculation of the collision probability K, in this case the parameterization of the braking system 2 is taken into account, i.e. a first parameter set P.1 of control parameters is adopted, wherein said first parameter set P.1 is matched to the currently present braking system 2 for the own vehicle, i.e. to the first vehicle variant V.1.

In order to ensure parameterization matching the vehicle variant V.j, first a plurality of parameter sets P.j is provided by the manufacturer of the emergency braking system 6, for example in a memory unit 12, wherein the plurality of parameter sets P.j apply to respective vehicle variants V.j within a model series with differently designed braking systems. From said provided parameter sets P.j, for example the correspondingly associated parameter set P.j for the current vehicle variant V.j is selected by the manufacturer of the vehicle 1. The selection of the corresponding parameter set P.j is carried out by means of an identifier X.j, i.e. for the first vehicle variant V.1 according to FIG. 1, with which a first identifier X.1 is associated, the first parameter set P.1 with which the first identifier X.1 is also associated is called up.

In this case, the identifier X.j characterizes the design of the respective braking system, wherein said design can for example be defined by the efficiency of the respective braking system or else by a design of the respective vehicle. In this case, in particular a minimal, a normal or a very good efficiency may apply, which for example is determined by the design of a braking force of the vehicle. The design can be determined depending on the axle configuration, i.e. the number of wheels and the driven wheels of the vehicle 1, wherein for example for the first vehicle variant V.1 according to FIG. 1, a 4×2 axle configuration is provided, i.e. two driven wheels 5.1 in the case of a total of four wheels 5. However, for example a 6×2 axle configuration with two driven wheels in the case of a total of six wheels is also possible, in which case a lift axle can additionally be provided. The design can furthermore be divided into a type of vehicle, i.e. a truck or a towing vehicle for a semi-trailer with a trailer or a tractor or a bus.

Using the determined collision probability K for the first vehicle variant V.1 while taking into account the first parameter set P.1 or the predictive estimation, if it comes to a collision the warning signals WS1, WS2, WS3 are first output at different points in time t1, t2 and then at the emergency braking point in time tN a demand for autonomous emergency braking is output to the braking control unit 3 by means of the emergency braking signal S1 when the vehicle 1 can still just be decelerated in time within the time tC to collision or for example the corresponding accident with damage to persons can be avoided.

The output of the warning signals SW1, SW2, SW3 is carried out in particular according to the requirements of the Guidelines ECE-R13 or 347/2012/EC. According thereto, it is specified that at a first point in time t1, which is at least 1.4 s before the initiation of autonomous emergency braking at the emergency braking point in time tN, a visible warning and for example an audible warning can be output to the driver, which is carried out by means of the first and second warning devices 15, 16. Furthermore, it is specified that at a second point in time t2, which is at least 0.8 s before the initiation of the autonomous emergency braking at the emergency braking point in time tN, in addition a haptic warning has to be made to the driver by means of the third warning device 17. The autonomous emergency braking is furthermore only to be carried out at the emergency braking point in time tN if the time tC to a collision is no more than 3 s. Said three points in time t1, t2, tN are in particular determined depending on the first parameter set P.1 for the vehicle 1 here, so that emergency braking can be reliably initiated with the corresponding warning signals SW1, SW2, SW3 within the statutory requirements.

As a further legal requirement, it is taken into account that during the warning phase, i.e. before initiation of the autonomous emergency braking, no more than 15 km/h or 30% of the relative speed vr between the own vehicle 1 and the object 10.i ahead is reduced. After initiating the emergency braking, a reduction of speed of at least 20 km/h is required. Both requirements regarding the speed reduction are enforced depending on the first parameter set P.1. Moreover, the autonomous emergency braking is carried out with a setpoint vehicle deceleration zSoll, which results in a vehicle actual deceleration zIst of at least −4 m/s$^2$, wherein setting the setpoint vehicle deceleration zSoll is carried out according to said requirement according to the first parameter set P.1.

A method according to an embodiment of the invention can for example be carried out as follows.

In an initial step St0, the emergency braking system 6 is initialized, for example after installing the emergency braking system 6 in a vehicle 1 of a first vehicle variant V.1.

In a first step St1, from a plurality of provided parameter sets P.j a first parameter set P.1 matching the own first vehicle variant V.1 is selected and stored in the emergency braking control unit 7.

In this case, the selection can be carried out using an identifier X.j that is associated with both the respective parameter set P.j and the vehicle variant V.j and that characterizes the vehicle variant V.j, i.e. in particular that indicates how powerful the own braking system 2 is and which design the vehicle variant V.j comprises.

Using the selected first parameter set P.1, in a second step St2, which is carried out while travelling, a collision probability K is determined, wherein this in particular includes determining a time tC to a collision while taking into account the design of the braking system 2 of said vehicle variant V.j.

The time tC to a collision that is calculated as a result thus advantageously indicates the actual time tC to a collision that is valid for the currently present vehicle variant, because the calculation has been carried out using the parameter set P.1 and actually existing values for the correspondingly used braking system. Accordingly, for calculation of the collision probability K for the own vehicle 1 with the detected object 10.i, it is taken into account whether the own vehicle 1 with the current relative speed vr.i and the current distance A.i and the current braking system characterized by means of the parameter set P.1 can still brake in time, i.e. the distance A.i is still sufficient, without a collision with the object 10.i with damage to persons occurring within the time tC. Thus, the calculation is no longer based on the worst braking system but on the actual braking system, whereby safety in the vehicle increases because of reliable control of the emergency braking system.

In a third step St3, using the collision probability K or the time tC to a collision, and while taking into account the selected first parameter set P.1, an emergency braking point in time tN at which autonomous emergency braking is to be initiated is first determined, wherein the emergency braking point in time tN is no more than 3 s before the time tC to a collision, i.e. tN≡tC≤3 s.

In a fourth step St4, a first point in time t1 is determined depending on the emergency braking point in time tN that takes into account the statutory requirement and at which a visible and audible warning to the driver is carried out. Said first point in time t1 is for example 1.4 s before initiating emergency braking, i.e. 1.4$s$ before the emergency braking point in time tN. In a fourth step St4, according to the same principle the second point in time t2 is determined, at which a visible warning and a haptic warning to the driver are carried out. Said second point in time t2 is for example 0.8 s before initiating the emergency braking at the emergency braking point in time tN.

In a sixth step St6, the setpoint vehicle deceleration zSoll to be demanded for the autonomous braking is determined while taking into account the selected parameter set P.j, wherein a vehicle actual deceleration zIst of more than −4 m/s$^2$ results from said setpoint vehicle deceleration zSoll. Furthermore, when determining the setpoint vehicle deceleration zSoll it is taken into account that the vehicle speed vFzg is reduced by at least 20 km/h when carrying out the emergency braking in order to meet statutory requirements, wherein the selected parameter set P.j is also taken into account for this.

REFERENCE CHARACTER LIST (PART OF THE DESCRIPTION)

1 vehicle
2 braking system
3 braking control unit
4 service brakes
5 wheels
5.1 driven wheels
6 emergency braking system
7 emergency braking control unit
8 environment detection system
8.1 sensor, radar sensor, LIDAR sensor
9 electromagnetic radiation
9a reflected electromagnetic radiation
10.i object
12 memory unit
15 first warning device
16 second warning device
17 third warning device
A.i distance
B angular range
F direction of travel
K collision probability
P.j parameter set
S1 emergency braking signal
S2 sensor signal
SW1 first warning signal (visible)
SW2 second warning signal (audible)
SW3 third warning signal (haptic)
t1 first point in time
t2 second point in time
tC time to collision
tN emergency braking point in time
U surroundings
vFzg vehicle speed
vO.i object speed
vr.i relative speed
V.j vehicle variant
□.i angle
X.j identifier
zSoll setpoint vehicle deceleration
zIst vehicle actual deceleration
St1, St2, St3, St4, St5, St6 steps of the method.

The invention claimed is:

1. An emergency braking system for a vehicle, the emergency braking system comprising:
a memory storing a plurality of parameter sets, each respective parameter set of the plurality of parameter sets corresponding to a different respective vehicle model series variant of a vehicle model series produced by a vehicle manufacturer, and
an emergency braking controller configured to:
select, based on a first vehicle model series variant of which the vehicle is an instance, a first parameter set from the plurality of parameter sets stored by the memory, the first parameter set corresponding to the first vehicle model series variant, and
generate, using the first parameter set as input, an emergency braking output signal for causing an emergency braking by service brakes of the vehicle.

2. The emergency braking system as claimed in claim 1, wherein the memory is integrated within the emergency braking controller.

3. The emergency braking system as claimed in claim 1, wherein each respective parameter set of the plurality of parameter sets comprises an identifier that characterizes the respective vehicle model series to which the respective parameter set corresponds.

4. A vehicle with an emergency braking system as claimed in claim 1.

5. The emergency braking system as claimed in claim 1, wherein each respective vehicle model series variant is defined by a respective service braking system.

6. The emergency braking system as claimed in claim 5, wherein each respective service braking system is characterized by a respective efficiency of the respective service braking system, wherein each respective efficiency is determined by a braking force.

7. The emergency braking system as claimed in claim 5, wherein a design of each respective service braking system is characterized by a design of a respective corresponding vehicle or type of vehicle.

8. The emergency braking system as claimed in claim 5, wherein the respective service braking system is provided, by the manufacturer of the vehicle model series, for the respective vehicle model series variant.

9. The emergency braking system as claimed in claim 5, wherein each respective parameter set includes parameters tailored to the respective service braking system that defines the respective vehicle model series variant.

10. The emergency braking system as claimed in claim 9, wherein the parameters of each respective parameter set are specified by the manufacturer of the vehicle model series.

11. The emergency braking system as claimed in 1, wherein the plurality of parameter sets corresponding to respective vehicle model series variants of the vehicle model series produced by the vehicle manufacturer includes parameter sets corresponding to respective vehicle model series variants different than the first vehicle model series variant.

12. The emergency braking system as claimed in claim 1, wherein the parameters of the first parameter set are specified by the manufacturer of the vehicle model series, and
wherein the emergency braking controller is configured to generate, using the first parameter set as input, the emergency braking output signal by:
receiving, from one or more sensors, sensor signals,
calculating, using the first parameter set and the sensor signals as input, a collision probability, and
generating, based on the calculated collision probability the emergency braking output signal.

13. A method for controlling an emergency braking system in a vehicle, the method comprising:
selecting, from a plurality of parameter sets stored by a memory, a first parameter set, each respective parameter set of the plurality of parameter sets is corresponding with a respective vehicle model series variant of a vehicle model series produced by a vehicle manufacturer, the first parameter set corresponding with a first vehicle model series variant which the vehicle is an instance;
determining, using the first parameter set as input, a collision probability; and
outputting warning signals and emergency braking signals depending on the determined collision probability.

14. The method as claimed in claim 13, wherein the first parameter set is selected according to a unique identifier characterizing the first vehicle model series variant.

15. The method as claimed in claim 13, wherein a time to a collision is determined depending on the selected first parameter set and depending on the time an emergency braking point in time is determined at which the emergency braking signal is output to initiate autonomous emergency braking.

16. The method as claimed in claim 15, wherein a first point in time for outputting a warning to the driver depending on a warning signal is determined according to the emergency braking point in time and while taking into account the selected first parameter set.

17. The method as claimed in claim 16, wherein an audible warning and a visible warning or a haptic warning is output to the driver.

18. The method as claimed in claim 15, wherein a second point in time for outputting a warning to the driver depending on a warning signal is determined according to the emergency braking point in time and while taking into account the selected first parameter set.

19. The method as claimed in claim 7, wherein a setpoint vehicle deceleration for carrying out the autonomous emergency braking is determined that results in a vehicle actual deceleration according to the selected first parameter set.

20. The method as claimed in claim 15, wherein the points in time, the emergency braking point in time and the vehicle actual deceleration take statutory requirements into account.

\* \* \* \* \*